(12) United States Patent
Shveidel et al.

(10) Patent No.: US 11,977,531 B1
(45) Date of Patent: May 7, 2024

(54) SYSTEMS AND METHODS OF DELTA-SNAPSHOTS FOR STORAGE CLUSTER WITH LOG-STRUCTURED METADATA

(71) Applicant: Dell Products L.P., Round Rock, TX (US)

(72) Inventors: Vladimir Shveidel, Pardes-Hana (IL); Amitai Alkalay, Kadima (IL)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/159,498

(22) Filed: Jan. 25, 2023

(51) Int. Cl.
G06F 7/00 (2006.01)
G06F 16/22 (2019.01)
G06F 16/2457 (2019.01)

(52) U.S. Cl.
CPC .... G06F 16/2246 (2019.01); G06F 16/24573 (2019.01)

(58) Field of Classification Search
CPC ........... G06F 16/2246; G06F 16/24573; G06F 16/164; G06F 16/128; G06F 16/27; G06F 16/2379; G06F 16/184; G06F 3/0484; G06F 3/064; G06F 3/0619; G06F 3/0679; G06F 3/067; G06F 3/065
See application file for complete search history.

(56) References Cited

U.S. PATENT DOCUMENTS

| | | | |
|---|---|---|---|
| 6,980,555 B2 * | 12/2005 | Mar | H04L 69/161 370/395.42 |
| 9,367,551 B2 * | 6/2016 | Beaverson | G06F 16/188 |
| 2006/0004721 A1 * | 1/2006 | Bedworth | G06F 16/2246 |
| 2019/0251067 A1 * | 8/2019 | Talagala | G06F 3/0679 |
| 2020/0089797 A1 * | 3/2020 | Rosen | G06F 11/3684 |
| 2020/0394648 A1 * | 12/2020 | Blackshear | H04L 63/12 |
| 2020/0409974 A1 * | 12/2020 | Ayzenberg | G06F 16/2246 |

* cited by examiner

*Primary Examiner* — Mohammad A Sana (74) *Attorney, Agent, or Firm* — Brian J. Colandreo; Heath M. Sargeant; Holland & Knight LLP (57) ABSTRACT

A method, computer program product, and computer system for maintaining, by a computing device, mapper objects, wherein the mapper objects may be variable size and include tops, mids, and leafs. Only new pointers may be maintained inside successor tops and mids. An overwrite map structure may be maintained on each of the tops, mids, and leafs. In the overwrite map structure on a mid, a snapshotID of a leaf that was last updated may be provided, from which the mid is to be inherited based upon a received IO.

20 Claims, 5 Drawing Sheets

SYSTEMS AND METHODS OF DELTA-SNAPSHOTS FOR STORAGE CLUSTER WITH LOG-STRUCTURED METADATA

BACKGROUND

Mapper (or similar storage application functions in a log-structured storage system) is one of the main components of a storage cluster. The responsibility of Mapper is, generally, to map user's logical addresses either directly to physical address of data or through some virtual intermediate layer (e.g., a VLB pointer in PowerStore). The big challenge for any Mapper architecture is that user's visible logical space may be extremely sparse, so straightforward implementations may cause a large Mapper footprint.

BRIEF SUMMARY OF DISCLOSURE

In one example implementation, a method, performed by one or more computing devices, may include but is not limited to maintaining, by a computing device, mapper objects, wherein the mapper objects may be variable size and include tops, mids, and leafs. Only new pointers may be maintained inside successor tops and mids. An overwrite map structure may be maintained on each of the tops, mids, and leafs. In the overwrite map structure on a mid, a snapshotID of a leaf that was last updated may be provided, from which the mid is to be inherited based upon a received JO.

One or more of the following example features may be included. Maintaining only new pointers inside successor tops and mids may include splitting the tops and mids without copying any pointers. An inheritance tree may be maintained for each volume family for the tops, mids, and leafs. A structure of the overwrite map structure may be a bits table. Different mapper schemes may be maintained for different volume families in a same system. A translation table may translate a UD logical address to a leaf physical address. The tops and mids may contain the translation table.

In another example implementation, a computing system may include one or more processors and one or more memories configured to perform operations that may include but are not limited to maintaining, by a computing device, mapper objects, wherein the mapper objects may be variable size and include tops, mids, and leafs. Only new pointers may be maintained inside successor tops and mids. An overwrite map structure may be maintained on each of the tops, mids, and leafs. In the overwrite map structure on a mid, a snapshotID of a leaf that was last updated may be provided, from which the mid is to be inherited based upon a received IO.

One or more of the following example features may be included. Maintaining only new pointers inside successor tops and mids may include splitting the tops and mids without copying any pointers. An inheritance tree may be maintained for each volume family for the tops, mids, and leafs. A structure of the overwrite map structure may be a bits table. Different mapper schemes may be maintained for different volume families in a same system. A translation table may translate a UD logical address to a leaf physical address. The tops and mids may contain the translation table.

In another example implementation, a computer program product may reside on a computer readable storage medium having a plurality of instructions stored thereon which, when executed across one or more processors, may cause at least a portion of the one or more processors to perform operations that may include but are not limited to maintaining, by a computing device, mapper objects, wherein the mapper objects may be variable size and include tops, mids, and leafs. Only new pointers may be maintained inside successor tops and mids. An overwrite map structure may be maintained on each of the tops, mids, and leafs. In the overwrite map structure on a mid, a snapshotID of a leaf that was last updated may be provided, from which the mid is to be inherited based upon a received IO.

One or more of the following example features may be included. Maintaining only new pointers inside successor tops and mids may include splitting the tops and mids without copying any pointers. An inheritance tree may be maintained for each volume family for the tops, mids, and leafs. A structure of the overwrite map structure may be a bits table. Different mapper schemes may be maintained for different volume families in a same system. A translation table may translate a UD logical address to a leaf physical address. The tops and mids may contain the translation table.

The details of one or more example implementations are set forth in the accompanying drawings and the description below. Other possible example features and/or possible example advantages will become apparent from the description, the drawings, and the claims. Some implementations may not have those possible example features and/or possible example advantages, and such possible example features and/or possible example advantages may not necessarily be required of some implementations.

BRIEF DESCRIPTION OF THE DRAWINGS

Like reference symbols in the various drawings indicate like elements.

DETAILED DESCRIPTION

System Overview:

In some implementations, the present disclosure may be embodied as a method, system, or computer program product. Accordingly, in some implementations, the present disclosure may take the form of an entirely hardware implementation, an entirely software implementation (including firmware, resident software, micro-code, etc.) or an implementation combining software and hardware aspects that may all generally be referred to herein as a "circuit," "module" or "system." Furthermore, in some implementations, the present disclosure may take the form of a computer program product on a computer-usable storage medium having computer-usable program code embodied in the medium.

In some implementations, any suitable computer usable or computer readable medium (or media) may be utilized. The computer readable medium may be a computer readable signal medium or a computer readable storage medium. The computer-usable, or computer-readable, storage medium (including a storage device associated with a computing device or client electronic device) may be, for example, but is not limited to, an electronic, magnetic, optical, electromagnetic, infrared, or semiconductor system, apparatus, device, or any suitable combination of the foregoing. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a digital versatile disk (DVD), a static random access memory (SRAM), a memory stick, a floppy disk, a mechanically encoded device such as punch-cards or raised structures in a groove having instructions recorded thereon, a media such as those supporting the internet or an intranet, or a magnetic storage device. Note that the computer-usable or computer-readable medium could even be a suitable medium upon which the program is stored, scanned, compiled, interpreted, or otherwise processed in a suitable manner, if necessary, and then stored in a computer memory. In the context of the present disclosure, a computer-usable or computer-readable, storage medium may be any tangible medium that can contain or store a program for use by or in connection with the instruction execution system, apparatus, or device.

In some implementations, a computer readable signal medium may include a propagated data signal with computer readable program code embodied therein, for example, in baseband or as part of a carrier wave. In some implementations, such a propagated signal may take any of a variety of forms, including, but not limited to, electromagnetic, optical, or any suitable combination thereof. In some implementations, the computer readable program code may be transmitted using any appropriate medium, including but not limited to the internet, wireline, optical fiber cable, RF, etc. In some implementations, a computer readable signal medium may be any computer readable medium that is not a computer readable storage medium and that can communicate, propagate, or transport a program for use by or in connection with an instruction execution system, apparatus, or device.

In some implementations, computer program code for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java®, Smalltalk, C++ or the like. Java® and all Java-based trademarks and logos are trademarks or registered trademarks of Oracle and/or its affiliates. However, the computer program code for carrying out operations of the present disclosure may also be written in conventional procedural programming languages, such as the "C" programming language, PASCAL, or similar programming languages, as well as in scripting languages such as Javascript, PERL, or Python. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the internet using an Internet Service Provider). In some implementations, electronic circuitry including, for example, programmable logic circuitry, field-programmable gate arrays (FPGAs) or other hardware accelerators, micro-controller units (MCUs), or programmable logic arrays (PLAs) may execute the computer readable program instructions/code by utilizing state information of the computer readable program instructions to personalize the electronic circuitry, in order to perform aspects of the present disclosure.

In some implementations, the flowchart and block diagrams in the figures illustrate the architecture, functionality, and operation of possible implementations of apparatus (systems), methods and computer program products according to various implementations of the present disclosure. Each block in the flowchart and/or block diagrams, and combinations of blocks in the flowchart and/or block diagrams, may represent a module, segment, or portion of code, which comprises one or more executable computer program instructions for implementing the specified logical function(s)/act(s). These computer program instructions may be provided to a processor of a general purpose computer, special purpose computer, or other programmable data processing apparatus to produce a machine, such that the computer program instructions, which may execute via the processor of the computer or other programmable data processing apparatus, create the ability to implement one or more of the functions/acts specified in the flowchart and/or block diagram block or blocks or combinations thereof. It should be noted that, in some implementations, the functions noted in the block(s) may occur out of the order noted in the figures (or combined or omitted). For example, two blocks shown in succession may, in fact, be executed substantially concurrently, or the blocks may sometimes be executed in the reverse order, depending upon the functionality involved.

In some implementations, these computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks or combinations thereof.

In some implementations, the computer program instructions may also be loaded onto a computer or other programmable data processing apparatus to cause a series of operational steps to be performed (not necessarily in a particular order) on the computer or other programmable apparatus to produce a computer implemented process such that the instructions which execute on the computer or other programmable apparatus provide steps for implementing the functions/acts (not necessarily in a particular order) specified in the flowchart and/or block diagram block or blocks or combinations thereof.

Figure 1:
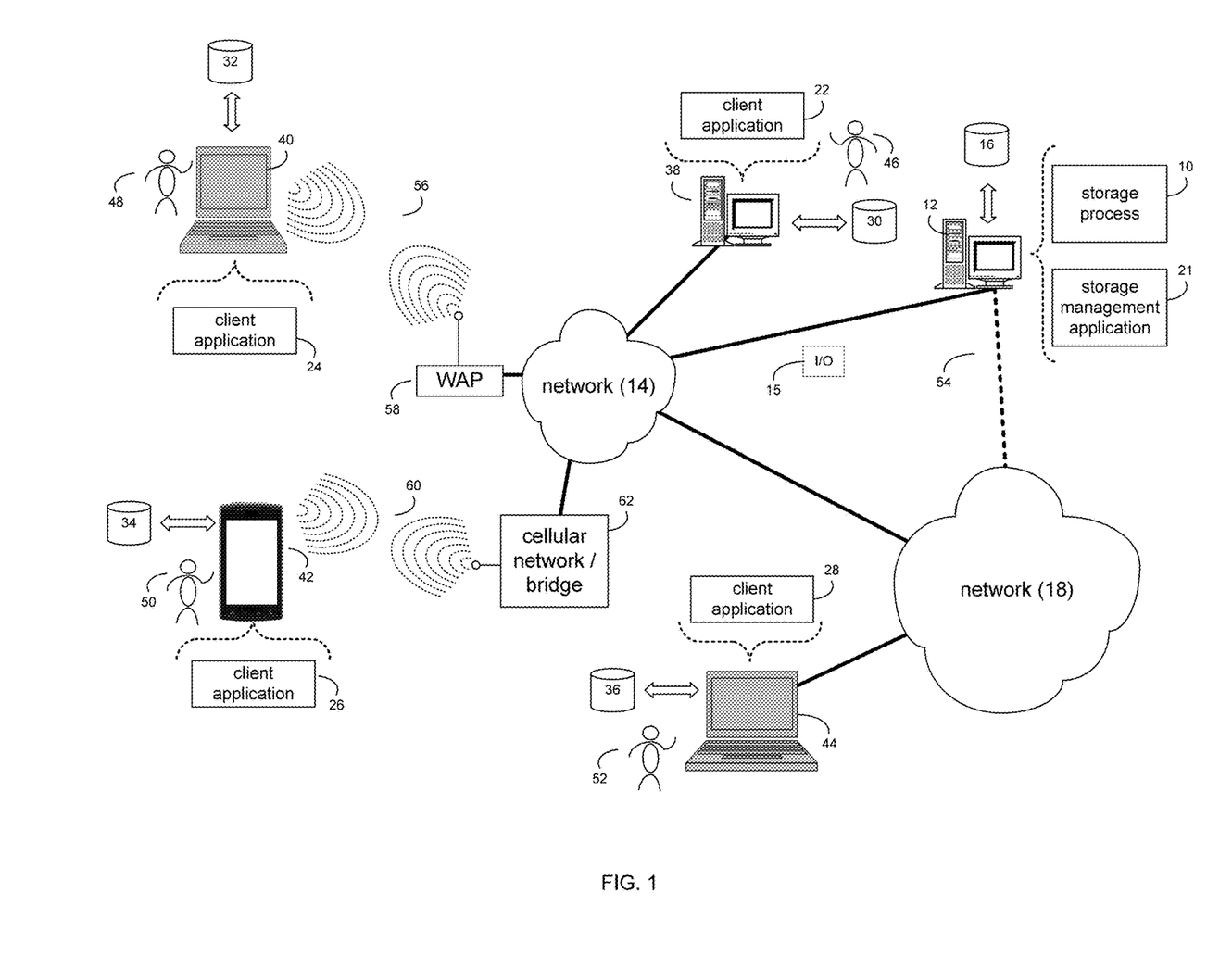
FIG. 1 is an example diagrammatic view of a storage process coupled to an example distributed computing network according to one or more example implementations of the disclosure.

Referring now to the example implementation of FIG. 1, there is shown storage process 10 that may reside on and may be executed by a computer (e.g., computer 12), which may be connected to a network (e.g., network 14) (e.g., the internet or a local area network). Examples of computer 12 (and/or one or more of the client electronic devices noted below) may include, but are not limited to, a storage system (e.g., a Network Attached Storage (NAS) system, a Storage Area Network (SAN)), a personal computer(s), a laptop computer(s), mobile computing device(s), a server computer, a series of server computers, a mainframe computer(s), or a computing cloud(s). As is known in the art, a SAN may include one or more of the client electronic devices, including a Redundant Array of Inexpensive Disks/Redundant Array of Independent Disks (RAID) device and a NAS system. In some implementations, each of the aforementioned may be generally described as a computing device. In certain implementations, a computing device may be a physical or virtual device. In many implementations, a computing device may be any device capable of performing operations, such as a dedicated processor, a portion of a processor, a virtual processor, a portion of a virtual processor, portion of a virtual device, or a virtual device. In some implementations, a processor may be a physical processor or a virtual processor. In some implementations, a virtual processor may correspond to one or more parts of one or more physical processors. In some implementations, the instructions/logic may be distributed and executed across one or more processors, virtual or physical, to execute the instructions/logic. Computer 12 may execute an operating system, for example, but not limited to, Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

In some implementations, as will be discussed below in greater detail, a storage process, such as storage process 10 of FIG. 1, may maintain, by a computing device, mapper objects, wherein the mapper objects may be variable size and include tops, mids, and leafs. Only new pointers may be maintained inside successor tops and mids. An overwrite map structure may be maintained on each of the tops, mids, and leafs. In the overwrite map structure on a mid, a snapshotID of a leaf that was last updated may be provided, from which the mid is to be inherited based upon a received IO.

In some implementations, the instruction sets and subroutines of storage process 10, which may be stored on storage device, such as storage device 16, coupled to computer 12, may be executed by one or more processors and one or more memory architectures included within computer 12. In some implementations, storage device 16 may include but is not limited to: a hard disk drive; all forms of flash memory storage devices; a tape drive; an optical drive; a RAID array (or other array); a random access memory (RAM); a read-only memory (ROM); or combination thereof. In some implementations, storage device 16 may be organized as an extent, an extent pool, a RAID extent (e.g., an example 4D+1P R5, where the RAID extent may include, e.g., five storage device extents that may be allocated from, e.g., five different storage devices), a mapped RAID (e.g., a collection of RAID extents), or combination thereof.

In some implementations, network 14 may be connected to one or more secondary networks (e.g., network 18), examples of which may include but are not limited to: a local area network; a wide area network or other telecommunications network facility; or an intranet, for example. The phrase "telecommunications network facility," as used herein, may refer to a facility configured to transmit, and/or receive transmissions to/from one or more mobile client electronic devices (e.g., cellphones, etc.) as well as many others.

In some implementations, computer 12 may include a data store, such as a database (e.g., relational database, object-oriented database, triplestore database, etc.) and may be located within any suitable memory location, such as storage device 16 coupled to computer 12. In some implementations, data, metadata, information, etc. described throughout the present disclosure may be stored in the data store. In some implementations, computer 12 may utilize any known database management system such as, but not limited to, DB2, in order to provide multi-user access to one or more databases, such as the above noted relational database. In some implementations, the data store may also be a custom database, such as, for example, a flat file database or an XML database. In some implementations, any other form(s) of a data storage structure and/or organization may also be used. In some implementations, storage process 10 may be a component of the data store, a standalone application that interfaces with the above noted data store and/or an applet/application that is accessed via client applications 22, 24, 26, 28. In some implementations, the above noted data store may be, in whole or in part, distributed in a cloud computing topology. In this way, computer 12 and storage device 16 may refer to multiple devices, which may also be distributed throughout the network.

In some implementations, computer 12 may execute a storage management application (e.g., storage management application 21), examples of which may include, but are not limited to, e.g., a storage system application, a cloud computing application, a data synchronization application, a data migration application, a garbage collection application, or other application that allows for the implementation and/or management of data in a clustered (or non-clustered) environment (or the like). In some implementations, storage process 10 and/or storage management application 21 may be accessed via one or more of client applications 22, 24, 26, 28. In some implementations, storage process 10 may be a standalone application, or may be an applet/application/script/extension that may interact with and/or be executed within storage management application 21, a component of storage management application 21, and/or one or more of client applications 22, 24, 26, 28. In some implementations, storage management application 21 may be a standalone application, or may be an applet/application/script/extension that may interact with and/or be executed within storage process 10, a component of storage process 10, and/or one or more of client applications 22, 24, 26, 28. In some implementations, one or more of client applications 22, 24, 26, 28 may be a standalone application, or may be an applet/application/script/extension that may interact with and/or be executed within and/or be a component of storage process 10 and/or storage management application 21. Examples of client applications 22, 24, 26, 28 may include, but are not limited to, e.g., a storage system application, a cloud computing application, a data synchronization application, a data migration application, a garbage collection application, or other application that allows for the implementation and/or management of data in a clustered (or non-clustered) environment (or the like), a standard and/or mobile web browser, an email application (e.g., an email client application), a textual and/or graphical user interface, a customized web browser, a plugin, an Application Programming Interface (API), or a custom application. The instruction sets and subroutines of client applications 22, 24, 26, 28, which may be stored on storage devices 30, 32, 34, 36, coupled to client electronic devices 38, 40, 42, 44, may be executed by one or more processors and one or more memory architectures incorporated into client electronic devices 38, 40, 42, 44.

In some implementations, one or more of storage devices 30, 32, 34, 36, may include but are not limited to: hard disk drives; flash drives, tape drives; optical drives; RAID arrays; random access memories (RAM); and read-only memories (ROM). Examples of client electronic devices 38, 40, 42, 44 (and/or computer 12) may include, but are not limited to, a personal computer (e.g., client electronic device 38), a laptop computer (e.g., client electronic device 40), a smart/data-enabled, cellular phone (e.g., client electronic device 42), a notebook computer (e.g., client electronic device 44), a tablet, a server, a television, a smart television, a smart speaker, an Internet of Things (IoT) device, a media (e.g., video, photo, etc.) capturing device, and a dedicated network device. Client electronic devices 38, 40, 42, 44 may each execute an operating system, examples of which may include but are not limited to, Android™, Apple® iOS®, Mac® OS X®; Red Hat® Linux®, Windows® Mobile, Chrome OS, Blackberry OS, Fire OS, or a custom operating system.

In some implementations, one or more of client applications 22, 24, 26, 28 may be configured to effectuate some or all of the functionality of storage process 10 (and vice versa). Accordingly, in some implementations, storage process 10 may be a purely server-side application, a purely client-side application, or a hybrid server-side/client-side application that is cooperatively executed by one or more of client applications 22, 24, 26, 28 and/or storage process 10.

In some implementations, one or more of client applications 22, 24, 26, 28 may be configured to effectuate some or all of the functionality of storage management application 21 (and vice versa). Accordingly, in some implementations, storage management application 21 may be a purely server-side application, a purely client-side application, or a hybrid server-side/client-side application that is cooperatively executed by one or more of client applications 22, 24, 26, 28 and/or storage management application 21. As one or more of client applications 22, 24, 26, 28, storage process 10, and storage management application 21, taken singly or in any combination, may effectuate some or all of the same functionality, any description of effectuating such functionality via one or more of client applications 22, 24, 26, 28, storage process 10, storage management application 21, or combination thereof, and any described interaction(s) between one or more of client applications 22, 24, 26, 28, storage process storage management application 21, or combination thereof to effectuate such functionality, should be taken as an example only and not to limit the scope of the disclosure.

In some implementations, one or more of users 46, 48, 50, 52 may access computer 12 and storage process 10 (e.g., using one or more of client electronic devices 38, 40, 42, 44) directly through network 14 or through secondary network 18. Further, computer 12 may be connected to network 14 through secondary network 18, as illustrated with phantom link line 54. Storage process 10 may include one or more user interfaces, such as browsers and textual or graphical user interfaces, through which users 46, 48, 50, 52 may access storage process 10.

In some implementations, the various client electronic devices may be directly or indirectly coupled to network 14 (or network 18). For example, client electronic device 38 is shown directly coupled to network 14 via a hardwired network connection. Further, client electronic device 44 is shown directly coupled to network 18 via a hardwired network connection. Client electronic device 40 is shown wirelessly coupled to network 14 via wireless communication channel 56 established between client electronic device 40 and wireless access point (i.e., WAP) 58, which is shown directly coupled to network 14. WAP 58 may be, for example, an IEEE 802.11a, 802.11b, 802.11g, 802.11n, 802.11ac, Wi-Fi®, RFID, and/or Bluetooth™ (including Bluetooth™ Low Energy) device that is capable of establishing wireless communication channel 56 between client electronic device 40 and WAP 58. Client electronic device 42 is shown wirelessly coupled to network 14 via wireless communication channel 60 established between client electronic device 42 and cellular network/bridge 62, which is shown by example directly coupled to network 14.

In some implementations, some or all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. Bluetooth™ (including Bluetooth™ Low Energy) is a telecommunications industry specification that allows, e.g., mobile phones, computers, smart phones, and other electronic devices to be interconnected using a short-range wireless connection. Other forms of interconnection (e.g., Near Field Communication (NFC)) may also be used.

In some implementations, various I/O requests (e.g., I/O request 15) may be sent from, e.g., client applications 22, 24, 26, 28 to, e.g., computer 12. Examples of I/O request 15 may include but are not limited to, data write requests (e.g., a request that content be written to computer 12) and data read requests (e.g., a request that content be read from computer 12).

Figure 2:
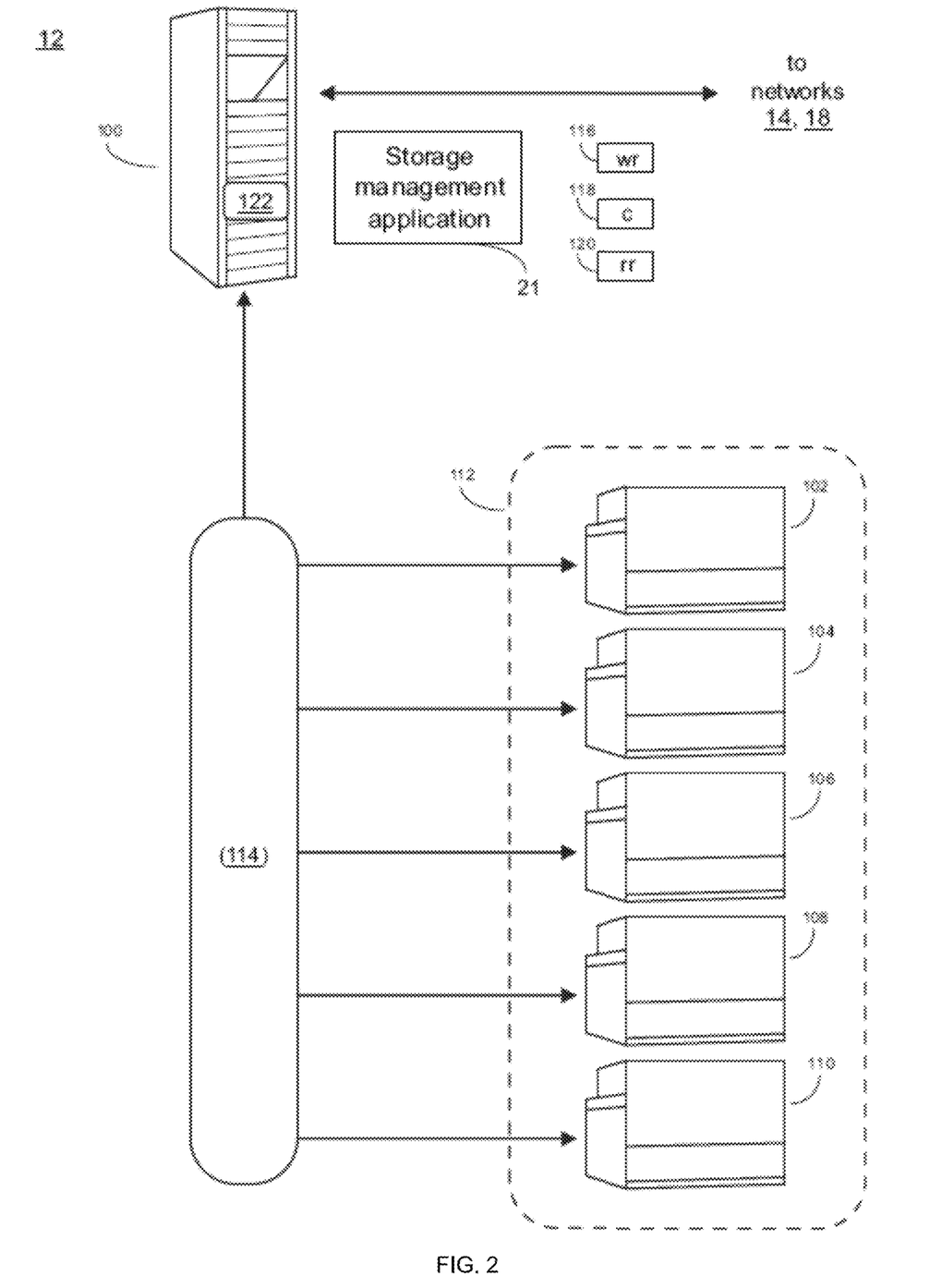
FIG. 2 is an example diagrammatic view of a storage system of FIG. 1 according to one or more example implementations of the disclosure.
Figure 3:
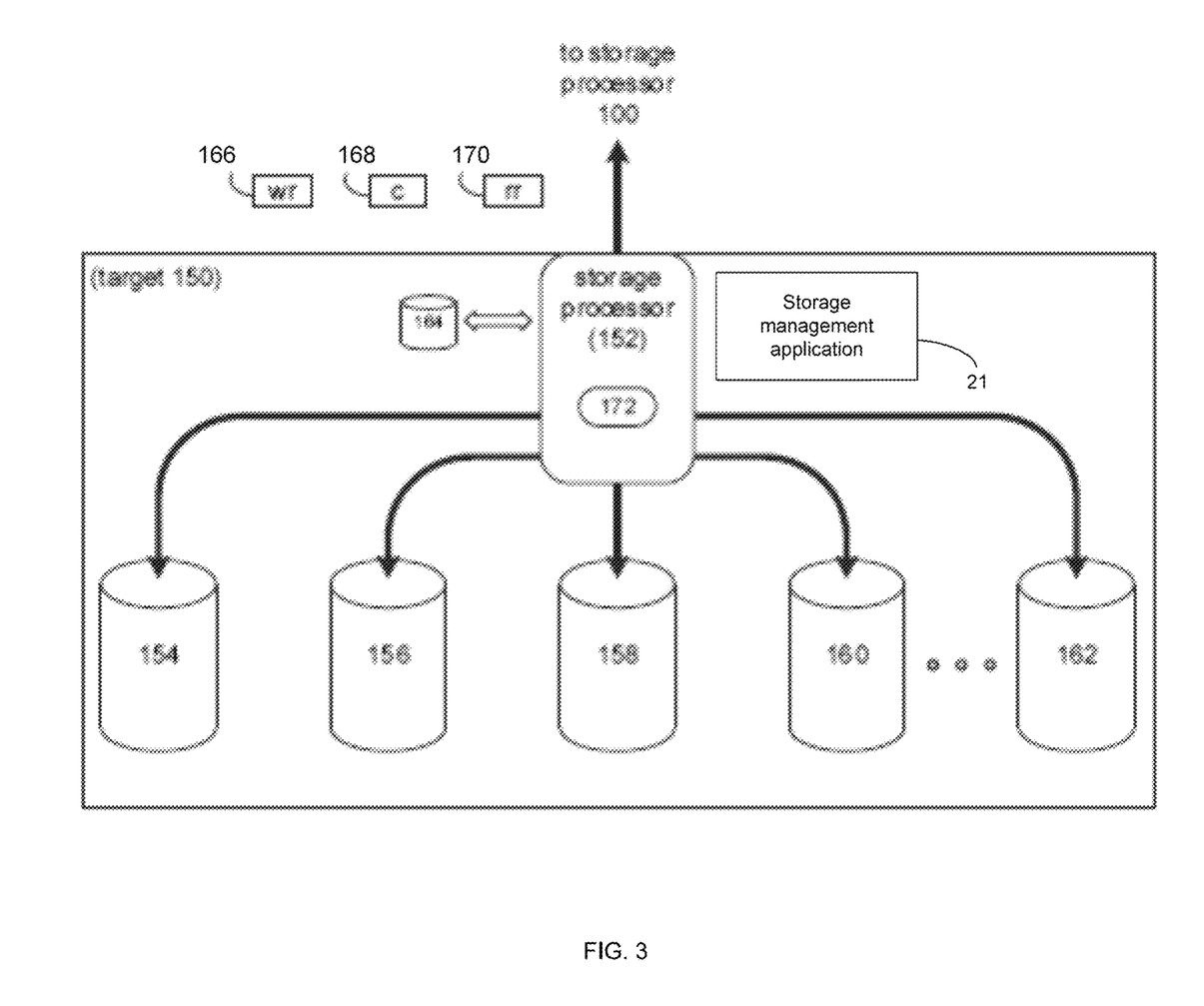
FIG. 3 is an example diagrammatic view of a storage target of FIG. 1 according to one or more example implementations of the disclosure.

Data Storage System:

Referring also to the example implementation of FIGS. 2-3 (e.g., where computer 12 may be configured as a data storage system), computer 12 may include storage processor 100 and a plurality of storage targets (e.g., storage targets 102, 104, 106, 108, 110). In some implementations, storage targets 102, 104, 106, 108, 110 may include any of the above-noted storage devices. In some implementations, storage targets 102, 104, 106, 108, 110 may be configured to provide various levels of performance and/or high availability. For example, storage targets 102, 104, 106, 108, 110 may be configured to form a non-fully-duplicative fault-tolerant data storage system (such as a non-fully-duplicative RAID data storage system), examples of which may include but are not limited to: RAID 3 arrays, RAID 4 arrays, RAID 5 arrays, and/or RAID 6 arrays. It will be appreciated that various other types of RAID arrays may be used without departing from the scope of the present disclosure.

While in this particular example, computer 12 is shown to include five storage targets (e.g., storage targets 102, 104, 106, 108, 110), this is for example purposes only and is not intended limit the present disclosure. For instance, the actual number of storage targets may be increased or decreased depending upon, e.g., the level of redundancy/performance/capacity required.

Further, the storage targets (e.g., storage targets 102, 104, 106, 108, 110) included with computer 12 may be configured to form a plurality of discrete storage arrays. For instance, and assuming for example purposes only that computer 12 includes, e.g., ten discrete storage targets, a first five targets (of the ten storage targets) may be configured to form a first RAID array and a second five targets (of the ten storage targets) may be configured to form a second RAID array.

In some implementations, one or more of storage targets 102, 104, 106, 108, 110 may be configured to store coded data (e.g., via storage management process 21), wherein such coded data may allow for the regeneration of data lost/corrupted on one or more of storage targets 102, 104, 106, 108, 110. Examples of such coded data may include but is not limited to parity data and Reed-Solomon data. Such coded data may be distributed across all of storage targets 102, 104, 106, 108, 110 or may be stored within a specific storage target.

Examples of storage targets 102, 104, 106, 108, 110 may include one or more data arrays, wherein a combination of storage targets 102, 104, 106, 108, 110 (and any processing/control systems associated with storage management application 21) may form data array 112.

The manner in which computer 12 is implemented may vary depending upon e.g., the level of redundancy/performance/capacity required. For example, computer 12 may be configured as a SAN (i.e., a Storage Area Network), in which storage processor 100 may be, e.g., a dedicated computing system and each of storage targets 102, 104, 106, 108, 110 may be a RAID device. An example of storage processor 100 may include but is not limited to a VPLEX™, VNX™, TRIDENT™, or Unity™ system offered by Dell EMC™ of Hopkinton, MA.

In the example where computer 12 is configured as a SAN, the various components of computer 12 (e.g., storage processor 100, and storage targets 102, 104, 106, 108, 110) may be coupled using network infrastructure 114, examples of which may include but are not limited to an Ethernet (e.g., Layer 2 or Layer 3) network, a fiber channel network, an InfiniBand network, or any other circuit switched/packet switched network.

As discussed above, various I/O requests (e.g., I/O request 15) may be generated. For example, these I/O requests may be sent from, e.g., client applications 22, 24, 26, 28 to, e.g., computer 12. Additionally/alternatively (e.g., when storage processor 100 is configured as an application server or otherwise), these I/O requests may be internally generated within storage processor 100 (e.g., via storage management process 21). Examples of I/O request 15 may include but are not limited to data write request 116 (e.g., a request that content 118 be written to computer 12) and data read request 120 (e.g., a request that content 118 be read from computer 12).

In some implementations, during operation of storage processor 100, content 118 to be written to computer 12 may be received and/or processed by storage processor 100 (e.g., via storage management process 21). Additionally/alternatively (e.g., when storage processor 100 is configured as an application server or otherwise), content 118 to be written to computer 12 may be internally generated by storage processor 100 (e.g., via storage management process 21).

As discussed above, the instruction sets and subroutines of storage management application 21, which may be stored on storage device 16 included within computer 12, may be executed by one or more processors and one or more memory architectures included with computer 12. Accordingly, in addition to being executed on storage processor 100, some or all of the instruction sets and subroutines of storage management application 21 (and/or storage process 10) may be executed by one or more processors and one or more memory architectures included with data array 112.

In some implementations, storage processor 100 may include front end cache memory system 122. Examples of front end cache memory system 122 may include but are not limited to a volatile, solid-state, cache memory system (e.g., a dynamic RAM cache memory system), a non-volatile, solid-state, cache memory system (e.g., a flash-based, cache memory system), and/or any of the above-noted storage devices.

In some implementations, storage processor 100 may initially store content 118 within front end cache memory system 122. Depending upon the manner in which front end cache memory system 122 is configured, storage processor 100 (e.g., via storage management process 21) may immediately write content 118 to data array 112 (e.g., if front end cache memory system 122 is configured as a write-through cache) or may subsequently write content 118 to data array 112 (e.g., if front end cache memory system 122 is configured as a write-back cache).

In some implementations, one or more of storage targets 102, 104, 106, 108, 110 may include a backend cache memory system. Examples of the backend cache memory system may include but are not limited to a volatile, solid-state, cache memory system (e.g., a dynamic RAM cache memory system), a non-volatile, solid-state, cache memory system (e.g., a flash-based, cache memory system), and/or any of the above-noted storage devices.

Storage Targets:

As discussed above, one or more of storage targets 102, 104, 106, 108, 110 may be a RAID device. For instance, and referring also to FIG. 3, there is shown example target 150, wherein target 150 may be one example implementation of a RAID implementation of, e.g., storage target 102, storage target 104, storage target 106, storage target 108, and/or storage target 110. An example of target 150 may include but is not limited to a VPLEX™, VNX™, TRIDENT™, or Unity™ system offered by Dell EMC™ of Hopkinton, MA. Examples of storage devices 154, 156, 158, 160, 162 may include one or more electro-mechanical hard disk drives, one or more solid-state/flash devices, and/or any of the above-noted storage devices. It will be appreciated that while the term "disk" or "drive" may be used throughout, these may refer to and be used interchangeably with any types of appropriate storage devices as the context and functionality of the storage device permits.

In some implementations, target 150 may include storage processor 152 and a plurality of storage devices (e.g., storage devices 154, 156, 158, 160, 162). Storage devices 154, 156, 158, 160, 162 may be configured to provide various levels of performance and/or high availability (e.g., via storage management process 21). For example, one or more of storage devices 154, 156, 158, 160, 162 (or any of the above-noted storage devices) may be configured as a RAID 0 array, in which data is striped across storage devices. By striping data across a plurality of storage devices, improved performance may be realized. However, RAID 0 arrays may not provide a level of high availability. Accordingly, one or more of storage devices 154, 156, 158, 160, 162 (or any of the above-noted storage devices) may be configured as a RAID 1 array, in which data is mirrored between storage devices. By mirroring data between storage devices, a level of high availability may be achieved as multiple copies of the data may be stored within storage devices 154, 156, 158, 160, 162.

While storage devices 154, 156, 158, 160, 162 are discussed above as being configured in a RAID 0 or RAID 1 array, this is for example purposes only and not intended to limit the present disclosure, as other configurations are possible. For example, storage devices 154, 156, 158, 160, 162 may be configured as a RAID 3, RAID 4, RAID 5 or RAID 6 array.

While in this particular example, target 150 is shown to include five storage devices (e.g., storage devices 154, 156, 158, 160, 162), this is for example purposes only and not intended to limit the present disclosure. For instance, the actual number of storage devices may be increased or decreased depending upon, e.g., the level of redundancy/performance/capacity required.

In some implementations, one or more of storage devices 154, 156, 158, 160, 162 may be configured to store (e.g., via storage management process 21) coded data, wherein such coded data may allow for the regeneration of data lost/corrupted on one or more of storage devices 154, 156, 158, 160, 162. Examples of such coded data may include but are not limited to parity data and Reed-Solomon data. Such coded data may be distributed across all of storage devices 154, 156, 158, 160, 162 or may be stored within a specific storage device.

The manner in which target 150 is implemented may vary depending upon e.g., the level of redundancy/performance/capacity required. For example, target 150 may be a RAID device in which storage processor 152 is a RAID controller card and storage devices 154, 156, 158, 160, 162 are individual "hot-swappable" hard disk drives. Another example of target 150 may be a RAID system, examples of which may include but are not limited to an NAS (i.e., Network Attached Storage) device or a SAN (i.e., Storage Area Network).

In some implementations, storage target 150 may execute all or a portion of storage management application 21. The instruction sets and subroutines of storage management application 21, which may be stored on a storage device (e.g., storage device 164) coupled to storage processor 152, may be executed by one or more processors and one or more memory architectures included with storage processor 152. Storage device 164 may include but is not limited to any of the above-noted storage devices.

As discussed above, computer 12 may be configured as a SAN, wherein storage processor 100 may be a dedicated computing system and each of storage targets 102, 104, 106, 108, 110 may be a RAID device. Accordingly, when storage processor 100 processes data requests 116, 120, storage processor 100 (e.g., via storage management process 21) may provide the appropriate requests/content (e.g., write request 166, content 168 and read request 170) to, e.g., storage target 150 (which is representative of storage targets 102, 104, 106, 108 and/or 110).

In some implementations, during operation of storage processor 152, content 168 to be written to target 150 may be processed by storage processor 152 (e.g., via storage management process 21). Storage processor 152 may include cache memory system 172. Examples of cache memory system 172 may include but are not limited to a volatile, solid-state, cache memory system (e.g., a dynamic RAM cache memory system) and/or a non-volatile, solid-state, cache memory system (e.g., a flash-based, cache memory system). During operation of storage processor 152, content 168 to be written to target 150 may be received by storage processor 152 (e.g., via storage management process 21) and initially stored (e.g., via storage management process 21) within front end cache memory system 172.

Mapper (or similar storage application functions in a log-structured storage system) is one of the main components of a storage cluster. The responsibility of Mapper is, generally, to map user's logical addresses either directly to physical address of data or through some virtual intermediate layer (e.g., a VLB pointer in PowerStore). The big challenge for any Mapper architecture is that user's visible logical space may be extremely sparse, so straightforward implementations may cause a large Mapper footprint. One of the classical approaches to reduce the footprint is a Mapper tree, and specifically, multilayer Mapper with, e.g., 3 layers of Mapping (and Mapper metadata (MD) pages): Tops, Mids, Leaves. This architecture allows thin provisioning of MD pages including thin provisioned snapshotting. The mapping chain (inside Mapper) in this case looks as follows Top→Mid→Leaf----->VLB.

Physical Layer

Typically, all Mapper MD pages have the same structure (array of pointers to the next level) and the same size (system page size, e.g., 4 K). In the simplest case, all MD pages (when allocated) get the unique logical block address (LBA), that actually is a physical block address (PBA) of this page inside the Mapper tier on the storage devices (e.g., drives). Different MD pages (i.e., Top/Mid/Leaf) reference each other by their LBA. Such an approach works well as long as all MD pages update "in place", since such an update preserves 1-to-1 LBA-PBA connection, and does not require updating all the references to the MD page.

Modern clusters maintain all the data and metadata objects as Log-structured, since it eliminates a lot of constrains and limitations caused by the "update in place" approach. The modern storage cluster applies the "copy-on-update metadata" method when a snapshot is created. This method has multiple example and non-limiting advantages. (1) It does not require any data copies, just metadata is involved. (2) Snapshot metadata pages are not created/copied immediately upon snapshot creation, just reference to the original volume MD page is created instead. The actual MD page copying is made just when (and if) the new write operation is performed either to the original volume or to the snapshot and the corresponding MD page is diverged.

However, there are some example and non-limiting drawbacks for this method. (1) Capacity wasting and performance overhead. In some cases, just (relatively) very small number of logical addresses is overwritten in a snapshot (e.g., asynchronous replication). At the same time, even if the only address in MD page (Leaf) was changed, the full MD page (512 pointers, 4 KB) must be copied to the snapshot. So, we potentially produce a lot of similar MD pages and hence waste the cluster physical capacity for MD pages that practically duplicates each other. Also, we waste other system resources (e.g., CPU cycles) to duplicate the pages. Note that extra-processing cost associated with copied pointers is relevant for all snapshot-related BG flows (like merge, delete, snap diff, etc.) and most regular BG flows (like Leaf Fixer) as well.

(2) Complexity and overhead of interaction with "dedup" feature. Maintaining references to the parent (source) MD page and different MD page/pointers flavors (like "source", "copy", etc.) complicates the dedup reference count scheme. We actually have two types of reference count: one is direct refcount of dedup, and the other one is implicitly derived from snapshot topology. Handling of those dependencies and cross-references is a very complex task, and it involves essential processing burden and resources wasting.

(3) Extra performance cost associated with Log-Structured systems. For some Log-Structured MD systems, additional performance cost is introduced, since once we copy pointers during snapshotting, it, generally, creates a necessity to update several pointers to the same MD object/page in case this object is relocated. Specifically, snapshotting creates the state when several MIDs may point to the same Leaf, so when this Leaf is relocated (because of Garbage Collection or other similar flow), we must update all the MIDs inside inheritance tree that points to this Leaf. Therefore, as will be discussed below, the present disclosure may address the some or all of the above inefficiencies using a delta snapshot for storage clusters with log-structured MD, that allows the reduction or even complete elimination of them.

Figure 4:
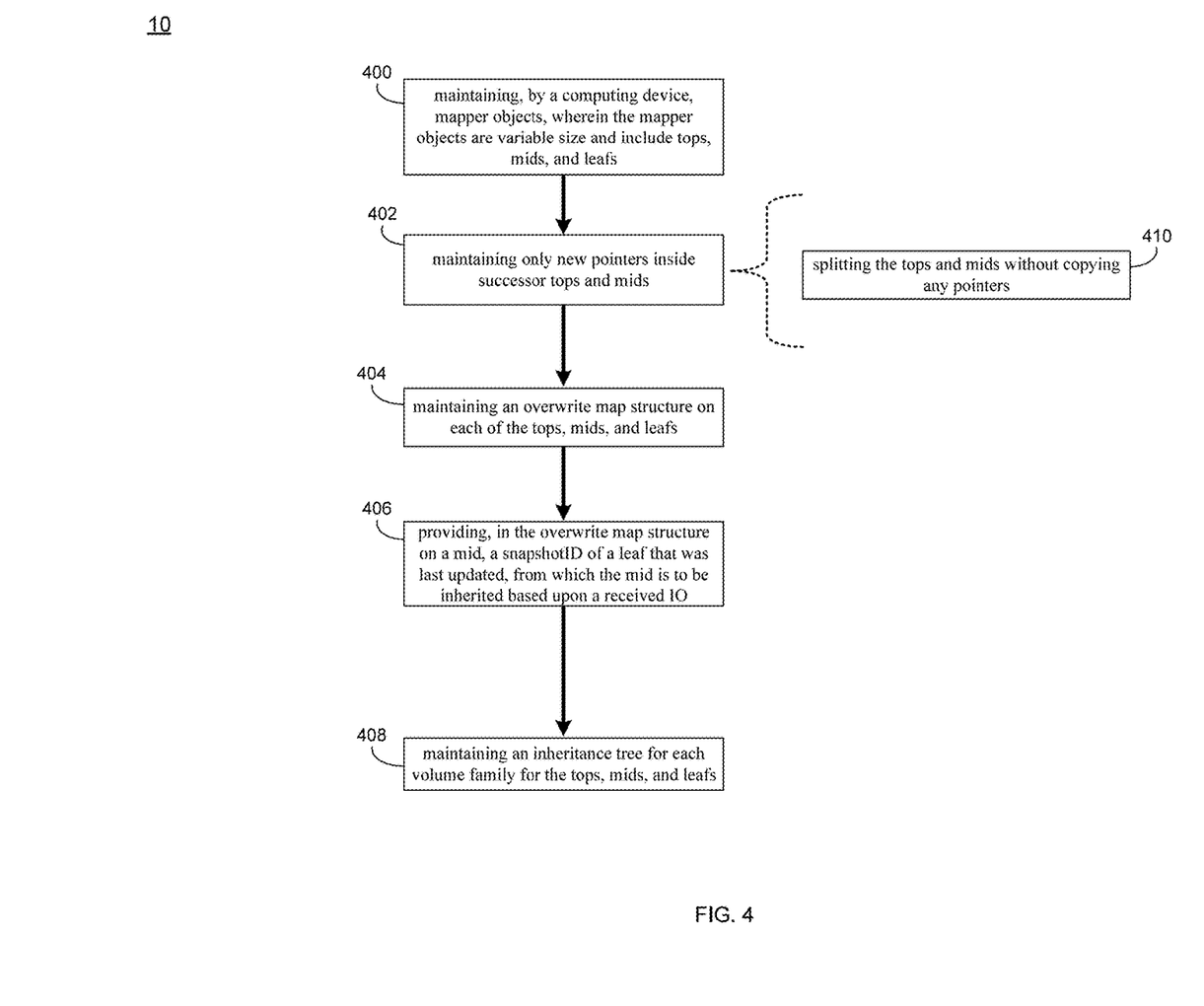
FIG. 4 is an example flowchart of a storage process according to one or more example implementations of the disclosure.
Figure 5:
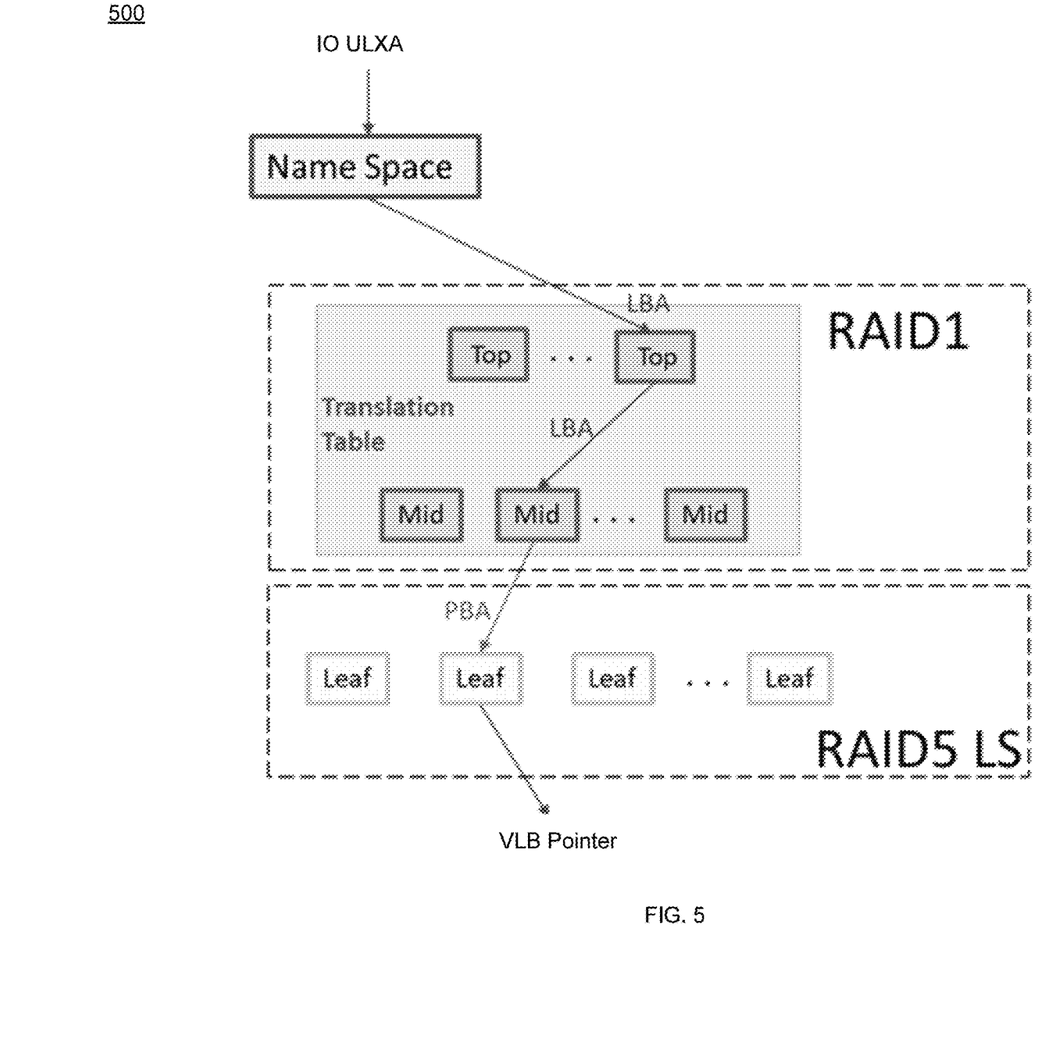
FIG. 5 is an example diagrammatic view of a storage architecture of a storage process according to one or more example implementations of the disclosure.

The Storage Process:

As discussed above and referring also at least to the example implementations of FIGS. 4-5, storage process 10 may maintain 400, by a computing device, mapper objects, wherein the mapper objects may be variable size and include tops, mids, and leafs. Storage process 10 may maintain 402 only new pointers inside successor tops and mids. Storage process 10 may maintain 404 an overwrite map structure on each of the tops, mids, and leafs. Storage process 10 may provide 406, in the overwrite map structure on a mid, a snapshotID of a leaf that was last updated, from which the mid is to be inherited based upon a received IO.

In some implementations, storage process 10 may maintain 400, by a computing device, mapper objects, wherein the mapper objects may be variable size and include tops, mids, and leafs. For example, and referring at least to the example implementation of FIG. 5, an example storage system architecture 500 is shown. Generally, a log-structured MD write makes things more complicated; however, on the other hand, it enables maintaining 400 variables size Mapper objects (e.g., top/mid/leaf) without additional complexity and extra cost. Storage process 10 may leverage this advantage and maintain different size tops, mids, and leafs. Thus, while the current mapper structure is mostly preserved, a translation table (TT) tree located may be located in RAID1 and may consist of the tops and mids, whereas the leaves may be log-structured RAID5, and logical references to the leaf may be ULXA.

In some implementations, the translation table may translate a UD logical address to a leaf physical address. For instance, storage process 10 may change the TT concept, such that the TT translates a UD logical address (ULXA) 4 leaf physical address (LFA); i.e., TT is ULXA→LFA map. That is, in some implementations, the TT may be a ULXA-ordered tree structure, where the TT is no longer a plain array with this concept (since ULXA range is generally huge, so mapping cannot be represented by a plain array).

In some implementations, the tops and mids may contain the translation table. For example, as shown in FIG. 5, storage process 10 may utilize the upper layers of Mapper Tree as the TT. The top-mid part of Mapper logically becomes the internal structure of the TT, and the mid contains the pointer to physical leaf address: PBA instead of LBA.

In some implementations, storage process 10 may maintain 402 only new pointers inside successor tops and mids. For example, storage process 10 may maintain (keep) only valid unique (not copied/inherited) pointers inside Mapper pages, making them more compact. Specifically, storage process 10 may maintain 402 just new pointers inside successor top/mids; no pointers are copying during split.

In some implementations, storage process 10 may maintain 404 an overwrite map structure on each of the tops, mids, and leafs. For instance, storage process 10 may maintain 404 a new Overwrite Map (OM) structure/MD on each Mapper level that tracks all snapshots having Mapper objects updated on the next/down level. Specifically, on mid-levels, storage process 10 may track all snapshots that have leaves (related to this mid LBA range) updated. Thus, storage process 10 may maintain an Overwrite Mapper Tree in parallel with the regular Mapper tree, that generally have the same levels and objects as the regular Mapper tree, e.g.,: OM for tops (OMT), OM for mids (OMM) and OM for leaves (OML).

In a general case, the Volume Family (VF) may maintain OM objects for any top/mid/leaf LBA range if this range (i.e., corresponding top/mid/leaf) in this VF have ever been split. If the range (top/mid/leaf) was never written or never split (i.e., was only written in the "root" volume), the corresponding OM object does not exist. The OM objects are bit-based, so much more compact than the corresponding regular (pointer-based) Mapper objects. The entire OMT may be cached entirely in the majority of cases (OMM and OMT layers).

In some implementations, storage process 10 may maintain 408 an inheritance tree for each volume family for the tops, mids, and leafs. For instance, for each VF, storage process 10 may maintain 408 Hierarchy/inheritance tree (IT) that describes the snapshot tree structure. Note that this is the structure with granularity of a snapshot (not any type of Mapper objects). Such structure is eventually already maintained by the Control Path (CP). "Create snapshot" flow may require always updating the IT, and note that this extremely compact (and rather static) structure that may be always located in memory (at least for "active" VFs).

In some implementations, storage process 10 may provide 406, in the overwrite map structure on a mid, a snapshotID of a leaf that was last updated, from which the mid is to be inherited based upon a received IO. For instance, once Mapper objects for a snapshot contain just unique pointers (no inherited pointers as noted above), the OM (via storage process 10) may provide 406 Mapper objects inheritance from predecessors on each Mapper level. Specifically, on Mid level, OMM may provide leaves inheritance from predecessor. In other words, storage process 10 may provide the answer of what is the SnapshotID, where this leaf was last updated, and correspondingly should be inherited from based upon the particular IO received. Then, the leaf may be read from this (predecessor) snapshot, instead of reading from the target one (where this leaf is missed).

In a general case, the OMT (via storage process 10) may provide the following example function/API: PreSnapID=OMT(TargetSnapID, MapperPage). So, if the system wants to read the MapperPage from TargetSnapID snapshot, storage process may ask the OMT and it returns PreSnapId of the snapshot, where this MapperPage should be actually read from.

In some implementations, maintaining 402 only new pointers inside successor tops and mids may include splitting 410 the tops and mids without copying any pointers. For instance, as noted above, storage process 10 may maintain 402 just valid pointers inside leaves and just new pointers inside successor top/mids; no pointers are copied during top/mid splits. As for the leaf, it is contemplated that storage process 10 could either use the same approach as for top/mid or continue copying pointers on leaves split, discussed further below. This may reduce the Mapper footprint (especially with sparse snapshots), but it may mean that regular MD pages (top/mid/leaves) may be maintained as variable size objects.

In some implementations, as discussed above, storage process 10 may maintain a new Overwrite Map (OM) structure on each Mapper level that tracks all snapshots having Mapper objects updated on the next/down level. Specifically, on mid-level, storage process 10 may track all snapshots that have leaves (related to this mid LBA range) updated. Thus, storage process 10 may maintain Overwrite Mapper Tree in parallel with regular Mapper tree, that generally have the same levels and objects as the regular Mapper tree, e.g., OM for Tops (OMT), OM for Mids (OMM) and OM for Leaves (OML). Once the OM is maintained not per specific top/mid/leaf (i.e., in the context of a specific volume), but for top/mid/leaf ranges in the context of the entire VF (each range once per VF), storage process 10 may maintain and lookup OMT as a regular Mapper tree of predefined snapshot/SnapshotID (OMT_ID) inside the VF. In other words, Mapper (which may be part of storage process 10) may lookup/resolution for some offsets range (e.g., associated with some mid) in the context of OMT_ID "snapshot" will return the corresponding OMM object instead of regular MID.

In some implementations, a structure of the overwrite map structure may be a bits table. For instance, the basic structure of the OM object may be a "bits table", where columns are snapshots existing in this VF; the rows may be specific lower-level objects (e.g., leaves for OMM). If the leave was updated in the context of some snapshot, the corresponding bit inside the table may be "1", otherwise it may be "0". Assuming that basic table described above is generally sparse in both dimensions, different techniques to compact it may be used. At least the following may be considered:

(a) The basic squeezed vertically "bit table" with bitmap of valid lines (i.e., offsets).
(b) A list of "dirty snapshots": "Offset/Pointer:NI,A,B, C . . . ", where "NI" is number of elements (indexes) in the list; "A", "B", "C" are indexes of snapshots where this Offset is dirty. This format is efficient when number of dirty indexes is small.
(c) The negative list: The same as the previous list, but the list instead contains "clean" snapshots ID (i.e., snapshots where this offset was not written) instead of the dirty ones. This format is efficient when most of snapshots are dirty for this "Offset/Pointer".
(d) Compressed "basic bit table".
(e) Any combination of the above.

The format (page type) of the OM object may be reconsidered (and changed if needed) upon any update of the OM object, depending on sparseness. The type that provides a minimum footprint is always best to be chosen. As mentioned above, the OMs are variable size objects and contain fixed size headers that in turn may contain at least the two following fields (1) Page size (actual size of this page/object) and (2) Page type (defines the object format, how the dirty bits are organized inside this page). Since the OM objects are compact (bit-based), in most practical cases the entire OMTs are maintained in memory for all "active" VFs. Nevertheless, OM objects demoting (like demoting of any other Mapper objects) is also generally possible.

In some implementations, in addition to the main MD/structures above, storage process 10 may also maintain some auxiliary/derivative structure, like SnapInheritnaceOrder for each active snapshot to optimize the OMT search for the last predecessor where the Mapper object was last updated.

Example and non-limiting high-level descriptions of the main flows are described below.

Read Flow: The algorithm of storage process 10 reading some logical address (offset) from the snapshot may be as follows:
(1) If the volume is the family root volume—just perform the regular read from the volume.
(2) Otherwise ask the OMT what the volume/snapshot is the closest ancestor that the offset was overwritten in (note that this may be either target snapshot or one of the target snapshot ancestors). Also note that OMT is most likely entirely cached, so search in OMT is a non-expensive operation.
(3) Read the required offset from the snapshot defined in the previous step (not necessarily from the target snapshot).

Write Flow: generally, write to snapshot/volume flow may involve updates:
(1) Regular Mapper update.
(2) Update of family OMT (in some implementations, this may be required just when Mapper page is split as discussed below).

Delete snapshot: straightforward:
(1) The Mapper MD pages related to the snapshot are deleted (or merged with child if it exists), the OMT bits related to this snapshot are also removed (or replaced by child references if merged to child).

In some implementations, there may be at least two (incremental) variants of the present disclosure. For instance, (1) the simplified one when just top and mid have the corresponding OM objects (i.e., OMT and OMM). In this case, leaves may still contain a copy of pointers inherited from the parent leaf In other words pointers are copied on leaf splitting (unlike the discussion above). Note that invalid pointers are not maintained in the leaf even in this example case. Here, OMT is used just to reach the relevant leaf without the necessity to duplicate pointers on top/mid-level. Advantageously, this alternative approach may provide an extremely small footprint of the OMT (since it contains just OMT and OMM and does not contain OML), minimal additional implications in write flow, as storage process 10 may need to update OMT just in case of any Mapper object is split, but does not need to update for any specific offset overwrite. However even the simplified alterative approach allows essentially a reduced MD footprint (no invalid pointers in leaves, and no copied pointers in top/mid that is especially valuable when there are a lot of sparse snapshots). It may also avoid multi-mid updates when the leaf is relocated, and may avoid the complexity of maintaining an inheritance tree for each top/mid.

(2) The other alternative approach may be the full one, when the OM objects are maintained for all top/mid-levels. This alternative may involve a higher footprint for OMT (still reasonable, assuming this is bit-based structure), and more additional implications in write flows since each offset overwrite inside snapshots require also updating of the corresponding bit inside OML (still reasonable, assuming that this is entirely cached in majority of cases).

On the other hand, in the addition to the gains provided by simplified alternative, it may also allow a complete elimination of different IDP pointers flavors (like "source", "copy", etc.), and may simplify "dedup"-related flows and reduce the corresponding cost dramatically. Specifically, no specific refcount handling is required, when an offset in the specific snapshot is deleted (deleted, not just merged to another snapshot) the reference count of the corresponding data page may be decremented in the regular way. As well, it may provide a simplified delete/merge/leaf fixer and other BG flows and reduce some or all the associated performance overhead.

In some implementations, different mapper schemes may be maintained for different volume families in a same system. For instance, there may be a mixed Mapper scheme. Since a delta-snapshotting approach described above and all the new/updated data-structures associated with this Mapper scheme is defined on the VF level (not on the cluster level), storage process 10 may maintain different Mapper schemes for different VFs in the same system. For example:

(1) Regular ("Copy-on-update") VFs that do not require OMT for relatively non-sparse or just old-style (NDU-ed) volumes.

(2) "Delta-snapshot" VFs for any newly created or just sparse VFs.

To provide this, storage process 10 may maintain the corresponding flag/type for each VF and apply the required Mapper scheme according to this flag.

The terminology used herein is for the purpose of describing particular implementations only and is not intended to be limiting of the disclosure. As used herein, the singular forms "a", "an" and "the" are intended to include the plural forms as well, unless the context clearly indicates otherwise. As used herein, the language "at least one of A, B, and C" (and the like) should be interpreted as covering only A, only B, only C, or any combination of the three, unless the context clearly indicates otherwise. It will be further understood that the terms "comprises" and/or "comprising," when used in this specification, specify the presence of stated features, integers, steps (not necessarily in a particular order), operations, elements, and/or components, but do not preclude the presence or addition of one or more other features, integers, steps (not necessarily in a particular order), operations, elements, components, and/or groups thereof.

The corresponding structures, materials, acts, and equivalents (e.g., of all means or step plus function elements) that may be in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications, variations, substitutions, and any combinations thereof will be apparent to those of ordinary skill in the art without departing from the scope and spirit of the disclosure. The implementation(s) were chosen and described in order to explain the principles of the disclosure and the practical application, and to enable others of ordinary skill in the art to understand the disclosure for various implementation(s) with various modifications and/or any combinations of implementation(s) as are suited to the particular use contemplated.

Having thus described the disclosure of the present application in detail and by reference to implementation(s) thereof, it will be apparent that modifications, variations, and any combinations of implementation(s) (including any modifications, variations, substitutions, and combinations thereof) are possible without departing from the scope of the disclosure defined in the appended claims.

What is claimed is:

1. A computer-implemented method comprising:
   maintaining, by a computing device, mapper objects, wherein the mapper objects are variable size and include tops, mids, and leafs;
   maintaining only new pointers inside successor tops and mids;
   maintaining an overwrite map structure on each of the tops, mids, and leafs; and
   providing, in the overwrite map structure on a mid, a snapshotID of a leaf that was last updated, from which the mid is to be inherited based upon a received IO.

2. The computer-implemented method of claim 1 wherein maintaining only new pointers inside successor tops and mids includes splitting the tops and mids without copying any pointers.

3. The computer-implemented method of claim 1 further comprising maintaining an inheritance tree for each volume family for the tops, mids, and leafs.

4. The computer-implemented method of claim 1 wherein a structure of the overwrite map structure is a bits table.

5. The computer-implemented method of claim 1 wherein different mapper schemes are maintained for different volume families in a same system.

6. The computer-implemented method of claim 1 wherein a translation table translates a UD logical address to a leaf physical address.

7. The computer-implemented method of claim 6 wherein the tops and mids contain the translation table.

8. A computer program product residing on a computer readable storage medium having a plurality of instructions stored thereon which, when executed across one or more processors, causes at least a portion of the one or more processors to perform operations comprising:
   maintaining mapper objects, wherein the mapper objects are variable size and include tops, mids, and leafs;
   maintaining only new pointers inside successor tops and mids;
   maintaining an overwrite map structure on each of the tops, mids, and leafs; and
   providing, in the overwrite map structure on a mid, a snapshotID of a leaf that was last updated, from which the mid is to be inherited based upon a received JO.

9. The computer program product of claim 8 wherein maintaining only new pointers inside successor tops and mids includes splitting the tops and mids without copying any pointers.

10. The computer program product of claim 8 wherein the operations further comprise maintaining an inheritance tree for each volume family for the tops, mids, and leafs.

11. The computer program product of claim 8 wherein a structure of the overwrite map structure is a bits table.

12. The computer program product of claim 8 wherein different mapper schemes are maintained for different volume families in a same system.

13. The computer program product of claim 8 wherein a translation table translates a UD logical address to a leaf physical address.

14. The computer program product of claim 13 wherein the tops and mids contain the translation table.

15. A computing system including one or more processors and one or more memories configured to perform operations comprising:
   maintaining mapper objects, wherein the mapper objects are variable size and include tops, mids, and leafs;
   maintaining only new pointers inside successor tops and mids;
   maintaining an overwrite map structure on each of the tops, mids, and leafs; and
   providing, in the overwrite map structure on a mid, a snapshotID of a leaf that was last updated, from which the mid is to be inherited based upon a received JO.

16. The computing system of claim 15 wherein maintaining only new pointers inside successor tops and mids includes splitting the tops and mids without copying any pointers.

17. The computing system of claim 15 wherein the operations further comprise maintaining an inheritance tree for each volume family for the tops, mids, and leafs.

18. The computing system of claim 15 wherein a structure of the overwrite map structure is a bits table.

19. The computing system of claim 15 wherein different mapper schemes are maintained for different volume families in a same system.

20. The computing system of claim 15 wherein a translation table translates a UD logical address to a leaf physical address, and wherein the tops and mids contain the translation table.

* * * * *